US006356875B1

(12) United States Patent
Green et al.

(10) Patent No.: US 6,356,875 B1
(45) Date of Patent: Mar. 12, 2002

(54) INTEGRATED PRODUCTION TRACKING AND PAY RATE CALCULATION SYSTEM

(75) Inventors: John W. Green, Heber Springs; Mike Threlkeld, Fayetteville; Cathy Julius, Rogers, all of AR (US); Alan Reynolds, Ashland City, TN (US); Clyde Howell, Garfield, AR (US)

(73) Assignee: Technetics Corp., Little Rock, AR (US)

( * ) Notice: Subject to any disclaimer, the term of this patent is extended or adjusted under 35 U.S.C. 154(b) by 0 days.

(21) Appl. No.: 09/025,721

(22) Filed: Feb. 18, 1998

(Under 37 CFR 1.47)

Related U.S. Application Data

(60) Provisional application No. 60/037,965, filed on Feb. 20, 1997.

(51) Int. Cl.[7] .............................................. G06F 17/00

(52) U.S. Cl. ............................................................ 705/9

(58) Field of Search ........................... 705/8, 9, 11, 32, 705/7

(56) References Cited

U.S. PATENT DOCUMENTS

| | | | | |
|---|---|---|---|---|
| 4,819,162 A | * | 4/1989 | Webb et al. | |
| 5,068,787 A | * | 11/1991 | Pipella et al. | |
| 5,416,694 A | * | 5/1995 | Parrish et al. | |
| 5,842,182 A | * | 11/1998 | Bonner et al. | 705/32 |
| 6,055,511 A | * | 4/2000 | Fields et al. | |
| 6,119,097 A | * | 9/2000 | Ibarra | 705/11 |
| 6,131,085 A | * | 10/2000 | Rossides | 705/1 |

FOREIGN PATENT DOCUMENTS

JP          408180115 A   *  7/1996

OTHER PUBLICATIONS

Derwent–ACC–NO1999–386000; Maritzen et al. Nov. 1999.*
Measuring factory performance. (yield, throughput, waste quality and inventory are the new yardsticks), Industrial Computing, p.23(2), Dialog File 275, Access No. 01318230. Sep. 1989.*
"Work Measurement Program", Small Business Report, v10n10, pp: 58, Dialog File 15, Access No. 00297089, Oct. 1985.*
"Product name: One–Staff", Per–Se Technology Inc., Dialog File 256, Access No. 01667781. No Date.*
"Product Name: Labor Performance 6.0", Macola Inc., Dialog File 256, Access No. 01492523, Feb. 1997.*
Nyweide, J., "Simply Sophisticated: Human resources management welcomes computerization", Management World, v16, n3, p34(2), Dialog File 75, Access No. 00112427, 1987.*
Heinen, J.C, "Automating the process for HRIS selection", Employment Relations Today, v21, n4, p371 (10), 1994.*

* cited by examiner

Primary Examiner—James P. Trammell
Assistant Examiner—Pierre Eddy Elisca
(74) Attorney, Agent, or Firm—Haynes & Boone, LLP

(57) ABSTRACT

System and method for an integrated production tracking and pay rate calculation system are disclosed. In a preferred embodiment, the production tracking and pay rate calculation system of the present invention is an automated tool for helping control labor costs and for interfacing with payroll as well as a time clock. The system evaluates department and employee productivity by tracking production of all products and hours worked by all employees. The system is designed to enable calculation of a cost per unit based on multiple employee skill levels and production units per hour, per function, and per product type. The summation of the cost per unit for all of the functions for one product, plus any overhead labor expenses, equates to a total labor cost for that product.

5 Claims, 17 Drawing Sheets

Fig. 3C

Employee Maintenance – New Employee — 300, 304

Tabs: General Information | Human Resources | Compensation | Attendance

State Taxes — 330
- State Tax Code: ARK
- Filing Status: Married
- Exemptions: 3 — Liability Acct: 1025
- Add'l Withholding: — Expense Acct:

W2 Information — 332
- Filling Status: Married
- Fed Exemptions: 3
- Add'l Withholding:
- ☐ 942 Employee   ☐ Legal Representative   ☐ Deceased
- ☐ Deferred Compensation   ☐ Statutory Employee   ☐ Pension Deductions
Wage History
Timeclock
Department

Pay Information — 336
- Shift: 02
- Pay Frequency: Weekly
- Pay Type: TechPay
- Pay Rate: 12.65
- Std Hours: 40.0
- Std OT1:
- Std OT2:

State Unemployment — 338
- Tax Code: AUT
- ☐ SUT Department Liability
- Liability Acct: 1025   ☐ SUT Expense Department
- Expense Acct: 2135

Payroll Taxes — 334

| Code | Exemption | Add'l Tax | Liab Acct | Dept Liab |
|------|-----------|-----------|-----------|-----------|
| ▲ MC1 | 3 | $0.00 | | |
| ∗ | | | | |

Information for Work Ticket 6000025301A

| Function | Desc | Sched Start | Sched End | Complete | Units | Minutes | Day End | Require Scan |
|---|---|---|---|---|---|---|---|---|
| 1009 | CDQC | 9/24/96 | 9/24/96 | 12/16/96 | 1 | 5 | No | Yes |
| 1011 | POUR | 9/24/96 | 9/24/96 | | 1 | 8 | No | Yes |
| 1013 | DIE | 9/24/96 | 9/24/96 | | 1 | 12 | No | Yes |
| 1015 | ART | 9/24/96 | 9/24/96 | | 1 | 15 | No | Yes |
| 1017 | MDQC | 9/24/96 | 9/24/96 | | 1 | 1 | Yes | Yes |
| 2040 | COMP | 9/25/96 | 9/25/96 | | 1 | 10 | No | No |
| 1020 | PWAX | 9/25/96 | 9/25/96 | | 1 | 10 | No | Yes |
| 1030 | MFIN | 9/25/96 | 9/25/96 | | 1 | 7 | Yes | Yes |
| 1035 | OPAQ | 9/26/96 | 9/26/96 | | 1 | 4 | No | Yes |
| 1040 | STAK | 9/26/96 | 9/26/96 | | 1 | 10 | Yes | Yes |

Work Ticket Info | Products | Required Inventory | Transactions

| Seq | Type | Function | Status | Date | Employee | Lock Step | Req Inv |
|---|---|---|---|---|---|---|---|
| 1 | P | 1009 | A | 12/16/96 8:12:41 AM | Employee One Julius | Yes | Yes |

Reject Production    Exit

Fig. 7

Information for Work Ticket 6000025301A

| Function | Desc | Sched Start | Sched End | Complete | Units | Minutes | Day End | Require Scan |
|---|---|---|---|---|---|---|---|---|
| 1009 | CDQC | 9/24/96 | 9/24/96 | 12/16/96 | 1 | 5 | No | Yes |
| 1011 | POUR | 9/24/96 | 9/24/96 | | 1 | 8 | No | Yes |
| 1013 | DIE | 9/24/96 | 9/24/96 | | 1 | 12 | No | Yes |
| 1015 | ART | 9/24/ | | | | | | |
| 1017 | MDQC | 9/24/ | | | | | | |
| 2040 | COMP | 9/25/ | | | | | | |
| 1020 | PWAX | 9/25/ | | | | | | |
| 1030 | MFIN | 9/25/ | | | | | | |
| 1035 | OPAQ | 9/26/ | | | | | | |
| 1040 | STAK | 9/26/ | | | | | | |

Reject Production

| Function | Description |
|---|---|
| 1009 | CDQC |

Reason for Reject: Tech Mistake

☑ Remove pay credit for rejected function.
☑ Court as a reject against the function's employee.
☐ Remove pay credit for subsequent functions.
☐ Count as a reject against subsequent functions.

[Okay] [Cancel]

Work Ticket Info | Produ

| Seq | Type | Function | St |
|---|---|---|---|
| 1 | P | 1009 | | eq Inv
Yes

[Reject Production] [Exit]

Employee Time Review

Employee:
Number: 1
Name: Cathy Julius

Date Range:
- ⦿ Current Pay Period
- ○ Custom Dates

Start: 11/30/96
End: 12/19/96

[Use New Dates]

Actions:
[Delete]
[Exit]

Employee Time Summary — 1004

| Clock Date | Type | Minutes |
|---|---|---|
| 12/4/96 | SCK | 239 |
| 12/4/96 | TC | 241 |
| 12/5/96 | SCK | 151 |
| 12/5/96 | TC | 329 |
| 12/6/96 | VAC | 480 |
| 12/9/96 | TC | 440 |
| 12/10/96 | VAC | 480 |
| 12/11/96 | VAC | 480 |

Time Clock Transactions — 1006

| Clock Date | Actual Date | Type | Minutes | Status | Ex. Code | |
|---|---|---|---|---|---|---|
| 12/4/96 8:00:00 AM | 12/4/96 8:00:00 AM | INS | 0 | A | | |
| 12/4/96 11:59:40 AM | 12/4/96 11:59:40 AM | OUT | 240 | A | | |
| 12/4/96 1:02:00 PM | 12/4/96 1:02:00 PM | INB | 0 | A | | |
| 12/4/96 1:03:00 PM | 12/5/96 12:32:00 PM | OUT | 1 | A | TCA | 12/5/96 |

Fig. 10

1000 ← (window)
1002 ← (date range section)

Fig. 11

PR Payroll – Green Dental Laboratories Inc.

Tech Pay

Tech-Pay

Period Start 09/24/96
Period End 12/28/97

Minimum Units for Remake Adjustments: 0

New Period
Calc Pay
Commit

| Review Period | | |
|---|---|---|
| Start | End | Start |
| 6/1/97 | 6/30/97 | R |
| 1/6/97 | 1/20/97 | R |
| 1/1/97 | 1/20/97 | R |
| 1/1/97 | 1/15/97 | R |

○ All Employees  ◉ One Employee   ARCHER, DONALD ▶   ◉ Detail  ○ Summary

| Emp# | Func | Prod$ | Credit$ | Rej$ | Gross$ | Units | Rejects | Reject% | Adj% | Net$ | Hours | Rate |
|---|---|---|---|---|---|---|---|---|---|---|---|---|
| 2 | 1009 | 2.00 | .00 | .00 | 2.00 | 1 | 0 | .00 | .00 | 2.00 | | |
| 2 | 1011 | 4.00 | .00 | .00 | 4.00 | 2 | 0 | .00 | 10.00 | 4.40 | | |
| 2 | 1013 | 6.00 | 2.00 | .00 | 8.00 | 3 | 0 | .00 | 10.00 | 8.80 | | |
| 2 | 1015 | 12.00 | .00 | 6.00 | 6.00 | 2 | 1 | 50.00 | 10.00 | 5.40 | | |
| | | 24.00 | 2.00 | 6.00 | 20.00 | | | | | 20.60 | 8.00 | 2.58 |

Errors and Warnings

1100

INTEGRATED PRODUCTION TRACKING AND PAY RATE CALCULATION SYSTEM

CROSS-REFERENCE TO PROVISIONAL APPLICATION

This application claims the benefit of U.S. Provisional Patent Application Ser. No. 60/037,965, filed on Feb. 20, 1997, which is hereby incorporated by reference in its entirety.

TECHNICAL FIELD

The invention relates generally to computer tracking systems and, more particularly, to an integrated production tracking and pay rate calculation system.

BACKGROUND OF THE INVENTION

In a production center, such as a dental laboratory, many factors may ideally be considered in determining, for each employee or "technician," the employee's hourly pay rate for an upcoming pay period and the total compensation due the employee (collectively, "TechPay"), based on a current hourly pay rate, for the current pay period. Such factors include, for example, the number of "units," or, in the case of a dental lab, the number of "teeth," worked on by the technician, the number of remakes that were the result of work performed by the technician, the amount of materials used by the technician to complete a particular function on a case as compared to other employees or some arbitrary standard, and the employee's skill level with respect to the performance of a particular function.

In particular, for a single case, it would be desirable to pay a technician according to the actual number of units the technician worked on for the case. Additionally, if a technician is consistently responsible for an unusually high number of remakes, ideally, his or her pay rate for an upcoming pay period should be downwardly adjusted and vice versa. Similarly, if a technician has a high or low materials usage, his or her pay rate for a future pay period should ideally be adjusted accordingly.

Previous methods of calculating TechPay have been by hand or by computer systems. Clearly, performing the necessary calculations by hand is time-consuming and often inaccurate. Moreover, available computer systems fail to take into account one or more of the above-noted factors in computing TechPay. In particular, most systems, rather than tracking each tooth as an individual unit, thereby tracking the exact number of teeth, or units, produced by a technician, tracking the exact number of rejects that were counted against a technician, and tracking the amount of inventory used in production by a technician, assign an arbitrary unit value, which does not give an accurate count of actual units produced, and accordingly, no correlation of inventory usage can be tracked.

Therefore, what is needed is a system for tracking units produced, remakes caused, and materials used by each of a number of technicians in a production center and using this information, in addition to technician skill level information, to calculate an hourly pay rate for each technician for an upcoming pay period and the total compensation due each technician for a previous pay period.

SUMMARY OF THE INVENTION

The present invention, accordingly, provides a system and method for an integrated production tracking and pay rate calculation system. In a preferred embodiment, the production tracking and pay rate calculation, or production/pay, system of the present invention is a tool for helping control labor costs and for interfacing with payroll as well as a time clock. The system evaluates department and employee productivity by tracking production of all products and hours worked by all employees. The system is designed to enable calculation of a cost per unit based on multiple employee skill levels and production units per hour, per function, and per product type.

The summation of the cost per unit for all of the functions for one product, plus any overhead labor expenses, equates to a total labor cost for that product.

In a dental laboratory, for example, examples of overhead labor expenses might include labor and costs for external remakes, management, pick-up and delivery, auxiliary staff, and any department not provided for in the production/pay system.

The production/pay system is designed to allow each company to customize the various parameter thereof to fit their exact needs. A sample formula for calculating production pay per unit might be:

$_per product/unit×_% labor=$_

MINUS _% remake factor=$_

MINUS labor/unit for model work=$_

MINUS labor/unit for pick-up and delivery=$_

MINUS labor/unit for auxiliary staff=$_

MINUS labor/unit for management staff=$_

EQUALS dollars available for production pay $_/unit.

The dollars available for production pay are divided between all functions necessary for constructing the product. The amount allocated for each function depends on the skill and time required to complete each function.

The system is designed to allow each company the flexibility to assign multiple production values for each function based on employee skill levels. The system parameters are flexible in the configuration and setup to provide for a variety of companies and products.

The production/pay system enables the following functions to be performed:

1. tracking of all paid hours by production hours, non-production hours, and benefit hours;
2. tracking of employee productivity by function and/or by product;
3. tracking of internal remakes by reason code;
4. tracking employee production values and actual units produced by function separately;
5. tracking of production by employee and department;
6. tracking of hours worked by employee, department, division, and company;
7. tracking of overtime hours by employee, department, division, and company;
8. tracking of other hours, such as vacation, holiday, and sick-leave;
9. tracking of overtime as straight time or time and a half for calculating production rates;
10. allowing supervisors to designate production or non-production hours, as well as alter employee credits for internal remake purposes; and
11. tracking of remakes and including them in all reports.

Printed reports for the above-listed information may be company-defined.

In a preferred embodiment, to build a production/pay schedule, the user selects a product from a list of products and then selects all functions required to build the selected product from a master list of functions. For each function, the user specifies (1) the number of product minutes required to complete the function, plus any additional minutes for drying, curing, etc, before the product can be moved to the next function; and (2) what percentage of revenue is attributed to the function, thereby providing a basis for calculating department profitability. The percentages should add up to 100%. An employee is paid based on at what skill level he/she performs for this function. A payroll cost may be assigned for each skill level for each function.

A technical advantage achieved with the invention is that each function can be assigned an optimum remake percentage for each skill level. An employee can be rewarded or penalized in pay for deviations above or below this optimum.

Another technical advantage achieved with the invention is that it will calculate all materials actually used to perform each function. An average materials usage for all employees can be calculated, such that each individual employee's materials usage can be compared to that average and his or her pay adjusted appropriately with reference to the deviation from the average.

Yet another technical advantage is that the remake tracking capability of the production/pay system affords the ability to deduct credit for work that was previously done if it does not meet quality control standards and the work has to be redone. In this manner, a technician is not paid twice for doing the same work.

Still another technical advantage of the present invention is that credit can be deducted from technicians that performed work along the way and did not catch the flaw that resulted in the failure to meet quality control standards. This ensures quality checking by all the technicians through the entire production life of the case, not just at certain predetermined check points.

Still another technical advantage of the present invention is that taking all of the above-noted factors into account results in the most detailed calculation of technician pay possible. Having the system perform all of the calculations, taking into account all of the factors with which a technician is involved (e.g., regular time worked, overtime worked, number of remakes, amount of inventory used, etc.) leaves no room for discrimination in determining a technician's pay rate.

BRIEF DESCRIPTION OF THE DRAWINGS

FIGS. 3A–3D illustrate an "Employee Maintenance" screen display of the production/pay system of FIG. 1.

FIG. 4 illustrates a screen display of the production/pay system of FIG. 1 for configuring functions that an employee is allowed to perform and the skill level of the employee for each of those functions.

FIG. 7 illustrates a screen display of the production/pay system of FIG. 1 for providing information with respect to performance of scheduled functions.

FIG. 8 illustrates a Reject Production screen display of the production/pay system of FIG. 1.

FIG. 9 illustrates a screen display of the production/pay system of FIG. 1 for requisitioning materials.

FIG. 10 is a screen display of the production/pay system of FIG. 1 for reviewing and adjusting employee time.

FIG. 11 is a screen display of the production/pay system of FIG. 1 for reviewing each employee's payroll dollar calculation for a specified evaluation period.

DESCRIPTION OF THE PREFERRED EMBODIMENT

Figure 1:
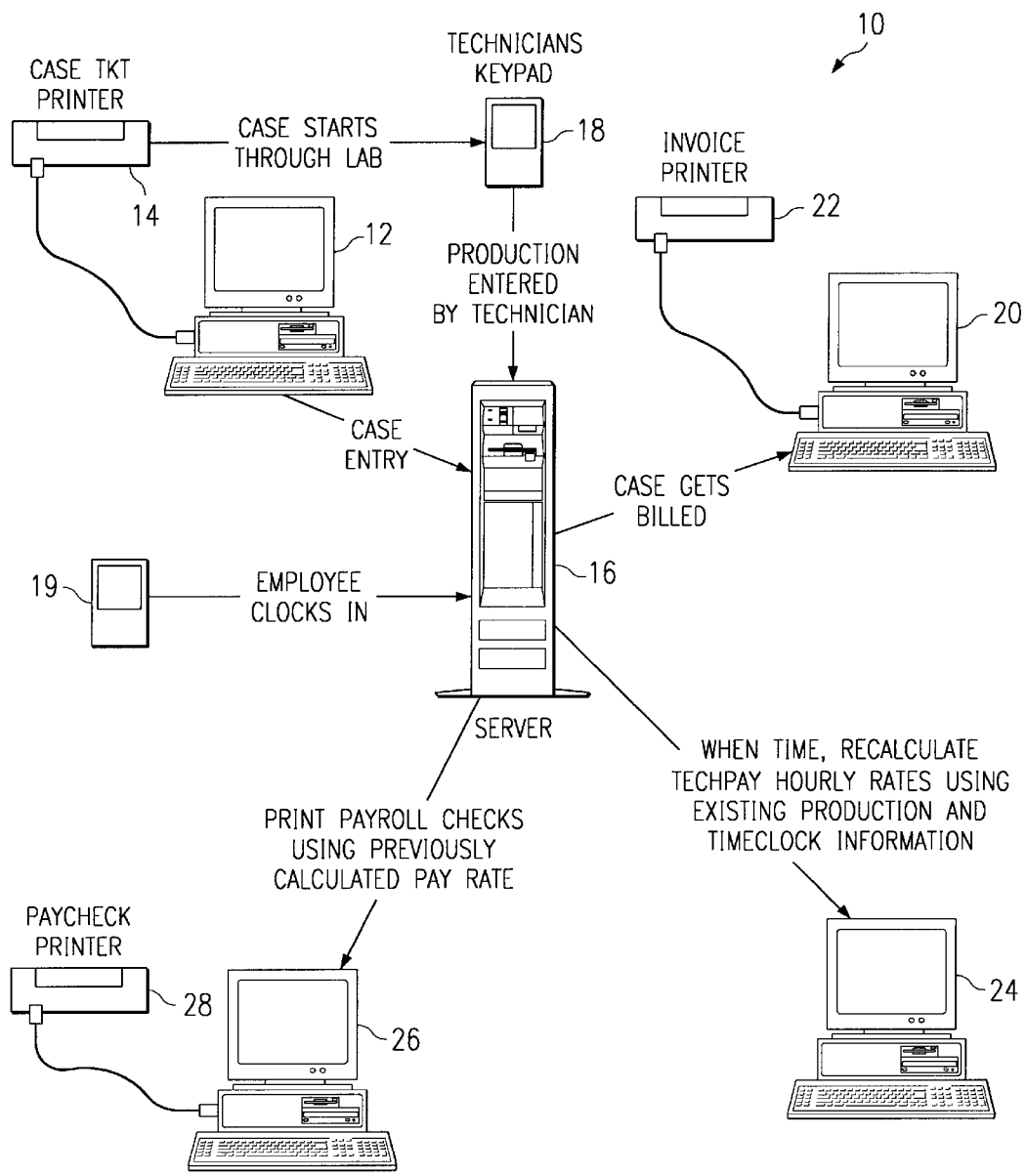
FIG. 1 is a block diagram of a production/pay system of the present invention.

FIG. 1 illustrates a production/pay system 10 of the present invention. The system 10 will typically be installed at a dental laboratory. As shown in FIG. 1, when a case comprising one or more products to be produced is received at the dental laboratory, a user enters information about the case into the system 10 using a computer 12, as will be described in detail below, and a case ticket including a product schedule for the case prints at a case ticket printer 14. The product schedule and other case ticket information is also uploaded to and stored on a server 16 to which the computer 12 is connected. Once the case has been entered into the system 10, production begins. As production progresses, technicians use keypads, collectively illustrated in FIG. 1 by a keypad 18, to enter their technician number, the case number, and the function number corresponding to the work they have performed on the case to record their work in connection with the case. In a preferred embodiment, the keypads 18 include bar code scanners for scanning information into the system 10 as well. The information entered using the keypads 18 is forwarded to and stored on the server 16. In addition, information generated by a time clock 19 in response to technicians clocking in and out on a daily basis is sent to and stored on the server 16.

After all of the functions scheduled for a case, as indicated on the case ticket, have been completed, an invoice is generated using a computer 20 and printer 22 and the completed case is shipped to the requesting doctor or dentist.

As will be described in greater detail below, periodically, typically once per pay period, the information stored on the server 16 is processed using a computer 24 and the production information and time clock information for a predetermined historical period, e.g., the previous three months, are used to calculate new hourly pay rates for all of the technicians for the next predetermined, e.g., three month, period. In addition, paycheck amounts are calculated by a computer 26 using the new hourly pay rate for each technician calculated using the computer 24 and paychecks for all of the technicians are printed on a paycheck printer 28.

It will be recognized that the functions performed by any one or more of the computers 12, 20, 24, and 26 may be implemented using a single computer. Similarly, the functions performed by any one or more of the printers 14, 22, and 26 may be performed by a single printer. It will also be recognized that instructions for execution by the computers 12, 20, 24, and 26 and server 16 for implementing the features of the present invention as described herein may be stored on computer-readable media accessible by the computers and server as necessary in a manner understood by those skilled in the art.

Figure 2:
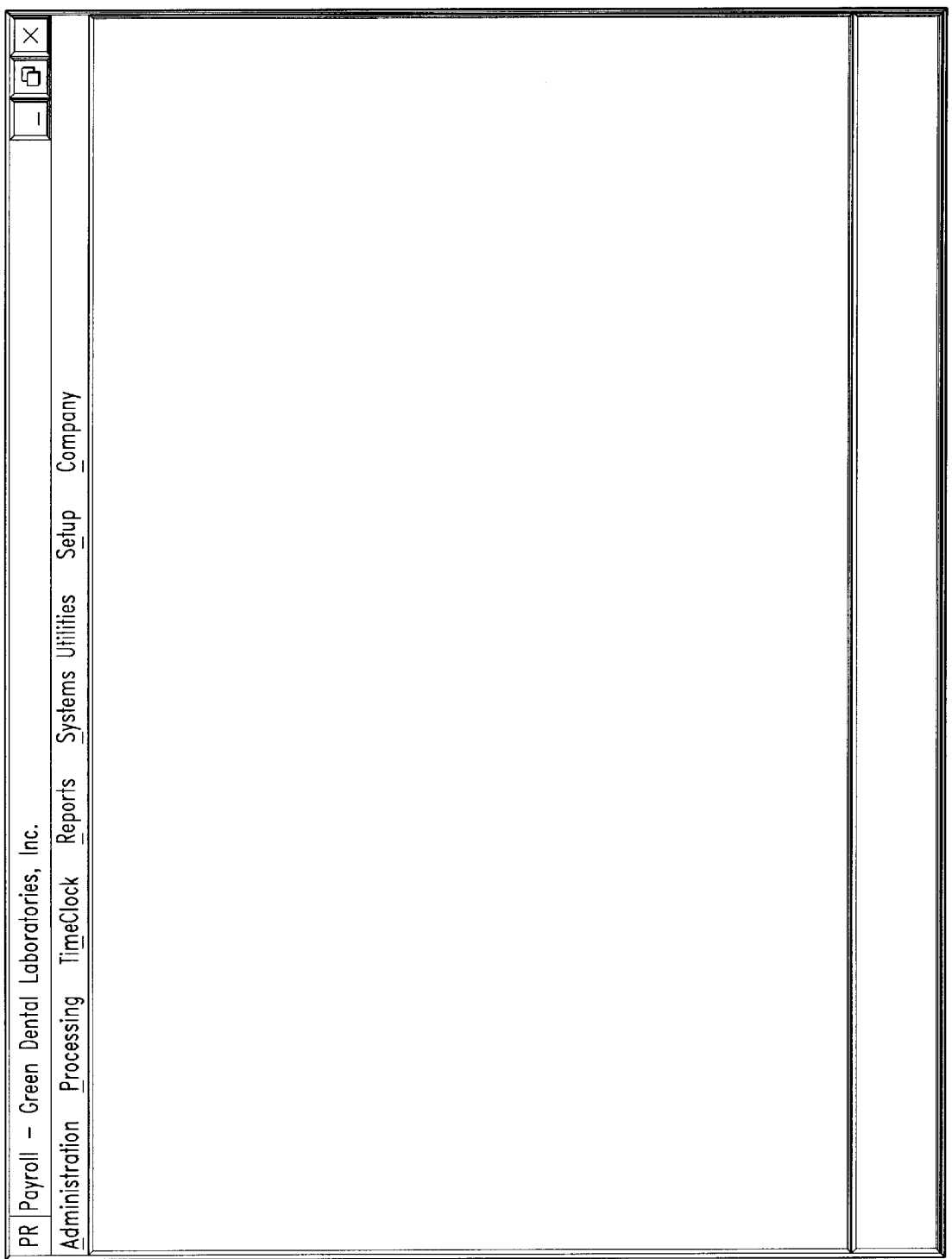
FIG. 2 illustrates a "Main" screen display of the production/pay system of FIG. 1.

FIG. 2 illustrates a main menu screen 200 of the system 10. From the screen 200, selection of appropriate menu choices enables a user to access a variety of screens to perform various applications, as described below.

Figure 3A:
Figure 3B:
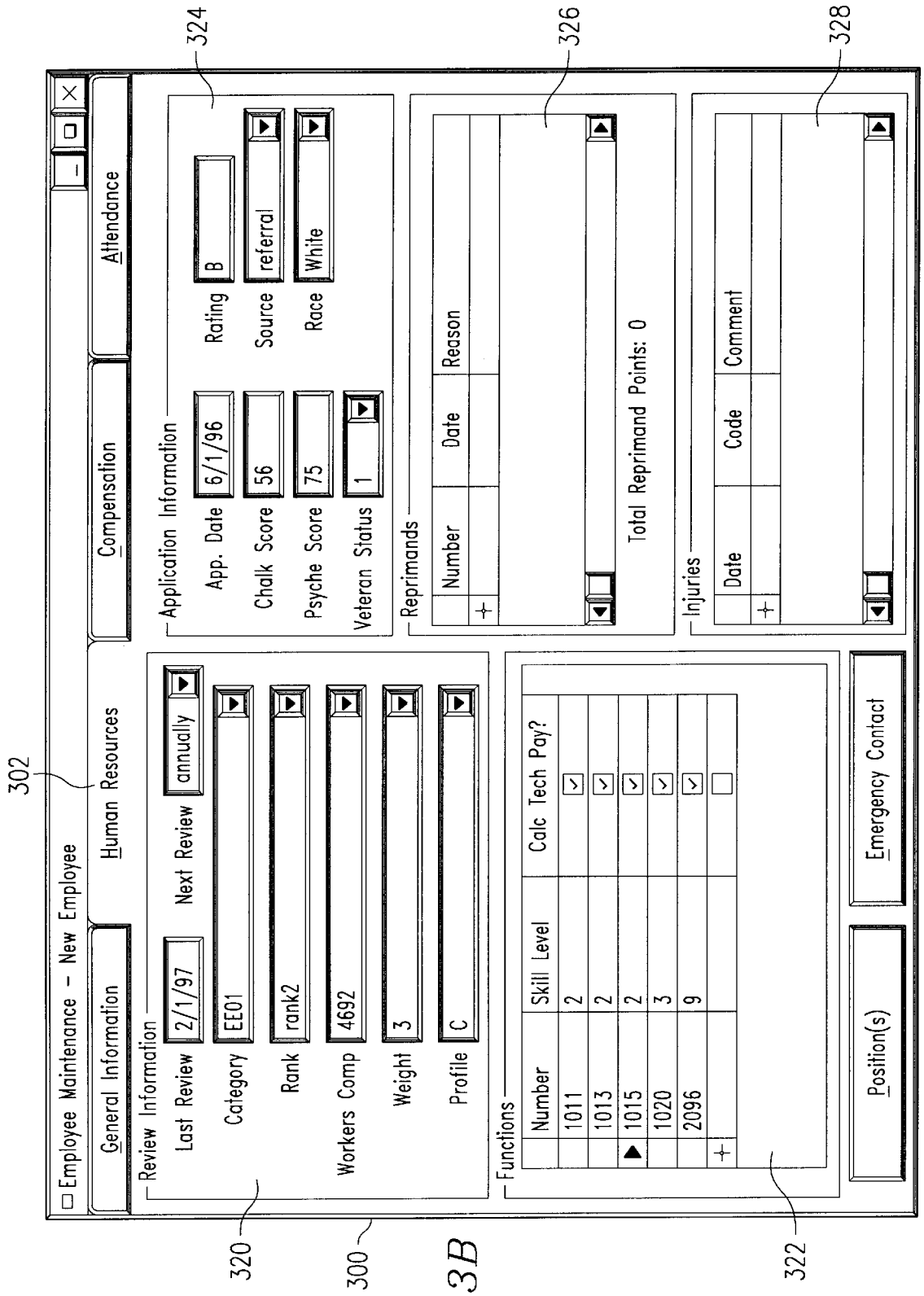
Figure 3D:
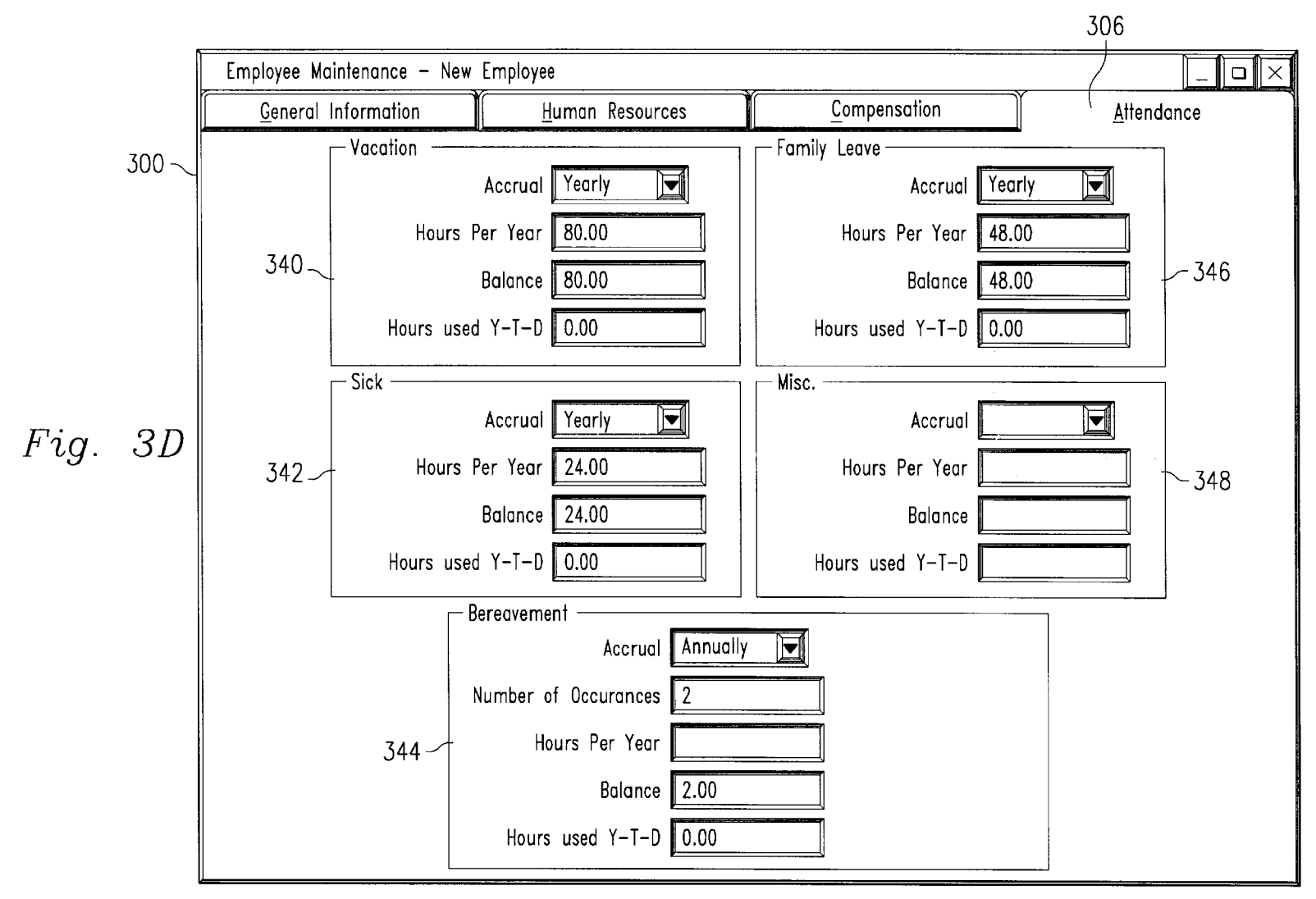

Referring to FIG. 3, an Employee Maintenance screen 300 includes four "tabs" respectfully designated "General Information" 301 (FIG. 3A), "Human Resources" 302 (FIG. 3B), "Compensation" 304 (FIG. 3C), and "Attendance" 306 (FIG. 3D). FIG. 3A illustrates the appearance of the screen 300 when the General Information tab 301 is selected. As the name suggests, the General Information tab 301 is used to enter general information about each employee/technician. For example, in an "Employee" section 310, information about an employee such as his or her name, address, phone number, social security number, birth date, and gender can be entered. In a "Status" section 312, employee status information, such as hire date, adjusted hire date, termination date, and reason for termination, can be entered. Finally, in an "Additional Information" section 314, additional information about an employee, such as the employee's initials, userID, spouse's name, and number of children, can be entered.

FIG. 3B illustrates the appearance of the screen 300 when the Human Resources tab 302 is selected. The Human Resources tab 302 is used to record additional HR-related information about the employee indicated in the corresponding General Information tab 301, in this case, Employee One Julius. In a "Review Information" section 320 of the Human Resources tab 302, information about employee reviews, such as the date of the employee's last review, as well as his or her category, rank, weight, and profile, can be entered. In a "Functions" section 322, the functions that the employee is capable of performing and his or her skill level for each can be entered. In an "Application Information" section 324, information about the employee's application, such as the date, rating, and source thereof, as well as his or her race and relevant competency test scores, can be entered. In a "Reprimands" section 326, information regarding any reprimands received by the employee can be noted. Similarly, in an "Injuries" section 328, information regarding any injuries suffered by the employee can be noted.

FIG. 3C illustrates the configuration of the screen 300 when the Compensation tab 304 has been selected. As the name suggests, the Compensation tab 304 enables a user to record compensation information for the employee indicated in the General Information tab 301. A "State Taxes" section 330 is provided for entering information about the employee's state tax. A "W2 Information" section 332 is provided for entering the employee's W2 information. A "Payroll Taxes" section 334 is provided for entering information about the employee's payroll taxes. A "Pay Information "section 336 is provided for entering information such as the employee's shift, pay frequency, pay type, pay rate, and standard number of hours. Finally, a "State Unemployment" section 338 is provided for entering state unemployment information for the employee.

FIG. 3D illustrates the configuration of the screen 300 when the Attendance tab 306 has been selected. Using this tab 306, information about the employee's time off, including vacation ("Vacation" section 340), sick time ("Sick" section 342), bereavement time ("Bereavement" section 344), family leave ("Family Leave" section 346) and miscellaneous reasons ("Miscellaneous" section 348), can be entered.

Referring now to FIGS. 3A–3D collectively, it should be noted that the entries that affect each technician's pay calculations directly include: (1) the Functions section 332 of the Human Resources tab 302 (FIG. 3B); (2) the "PayType" dropdown box in the Pay Information section 336 of the Compensation tab 304; and (3) the PayRate field in the Pay Information section 336 of the Compensation tab 304. The PayRate field is updatable by a user and is completed automatically by the system 10 for technicians that have a "PayType" of "TechPay."

Figure 4:
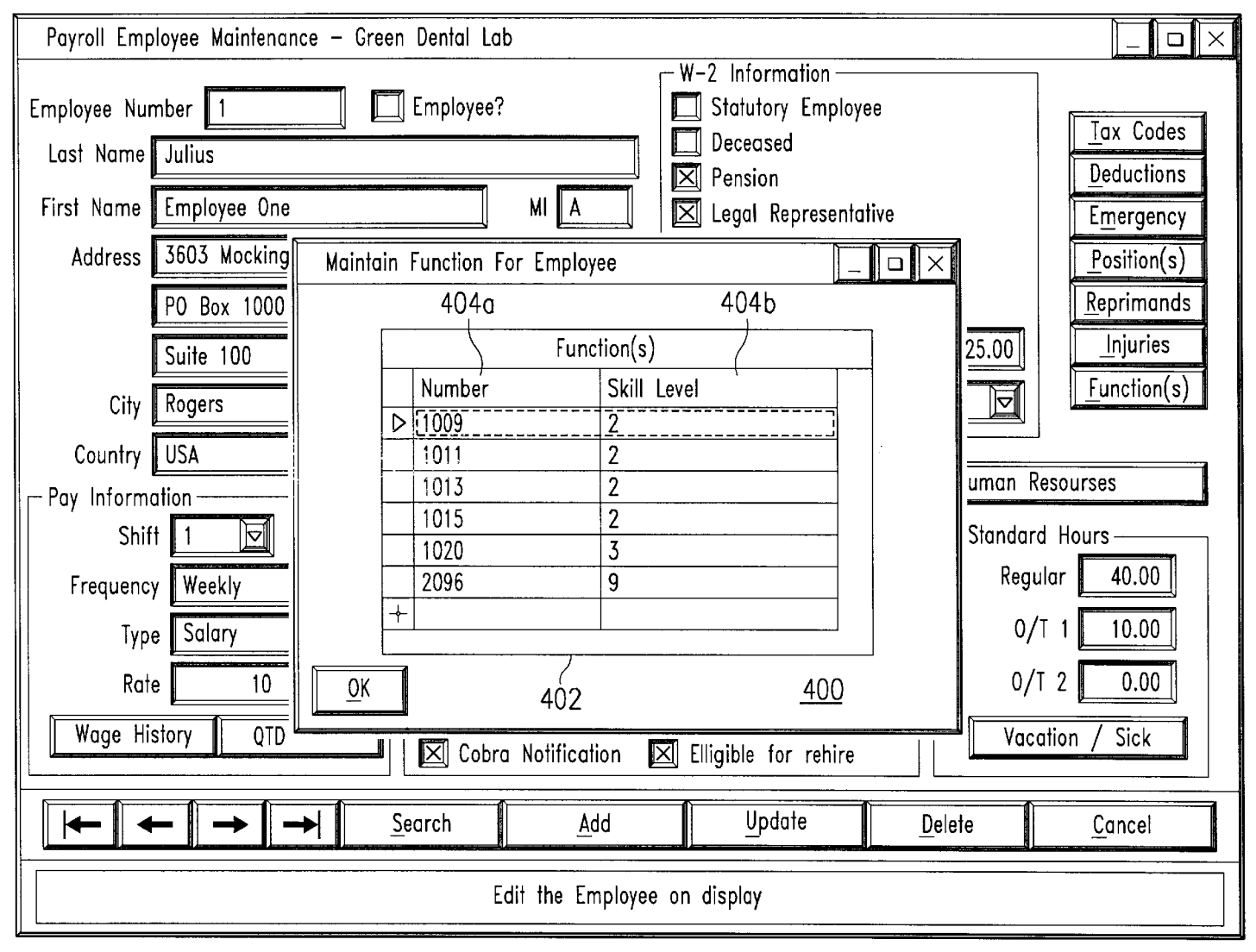

FIG. 4 illustrates a screen display entitled "Maintain Functions for Employee" 400 used for designating the functions that an employee, in this case "Employee One Julius," is permitted to perform, as well as the employee's skill level for each of those functions. In particular, the screen 400 includes a table 402 entitled "Function(s)" and having a first column 404a entitled "Number," in which each of a plurality of functions is designated by number, and a second column 404b entitled "Skill Level," in which each of the functions listed in the first column are assigned a skill level. For example, Employee One Julius' skill level for function number 1009 is 2, while the employee's skill level for function number 2096 is 9. The skill level will affect the dollar amount the employee will receive for performing a unit of each designated function in building a product, as described in greater detail below.

Figure 5:
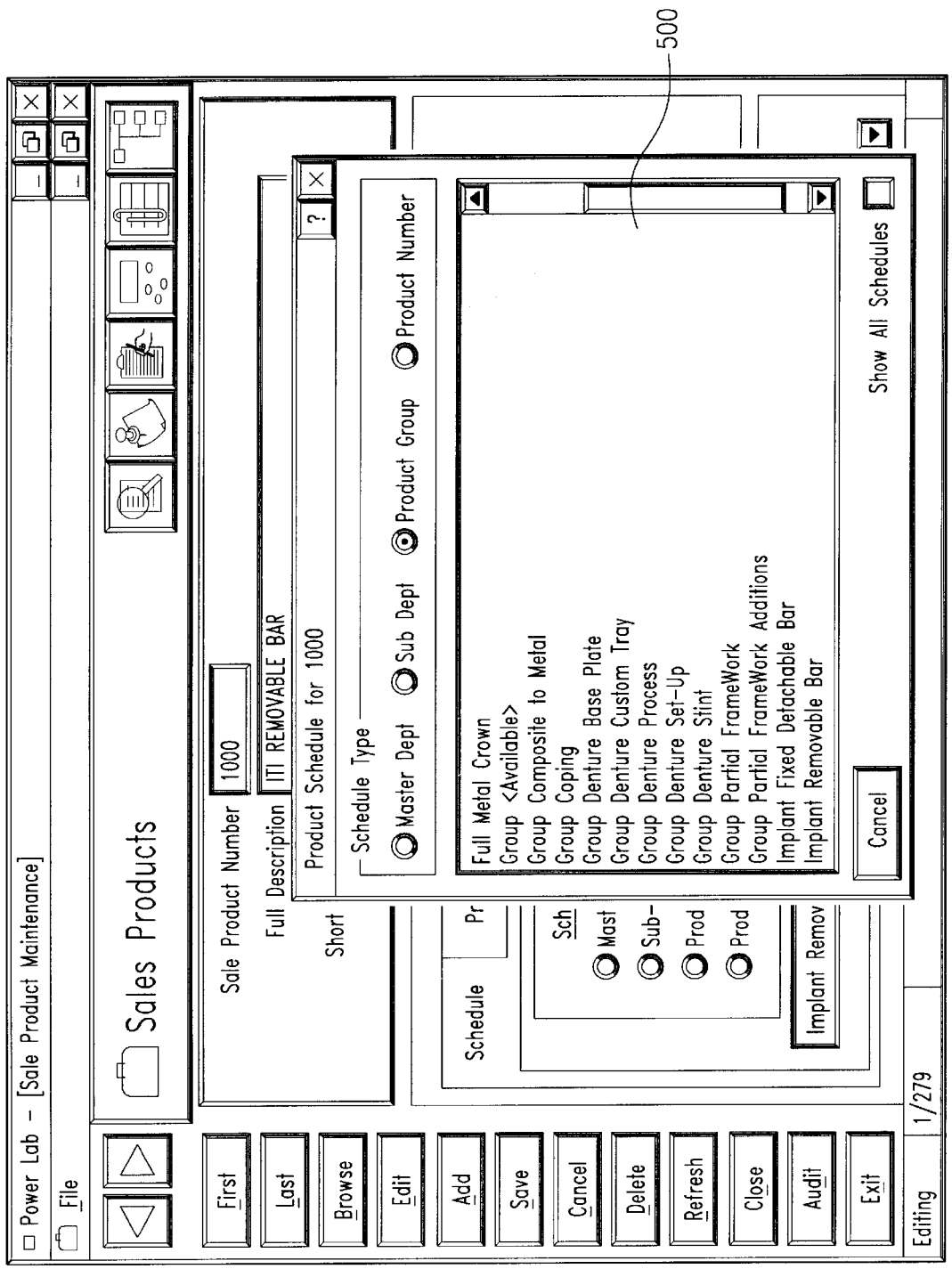
FIG. 5 illustrates a screen display of the production/pay system of FIG. 1 for assigning a schedule to a case.

As described above with reference to FIG. 1, when a case is received at the lab, a schedule is assigned based on the products that are to be built for the case. In particular, as shown in FIG. 5, this is accomplished by selecting one or more products from the list displayed in a "Product Schedule" window 500.

Figure 6A:
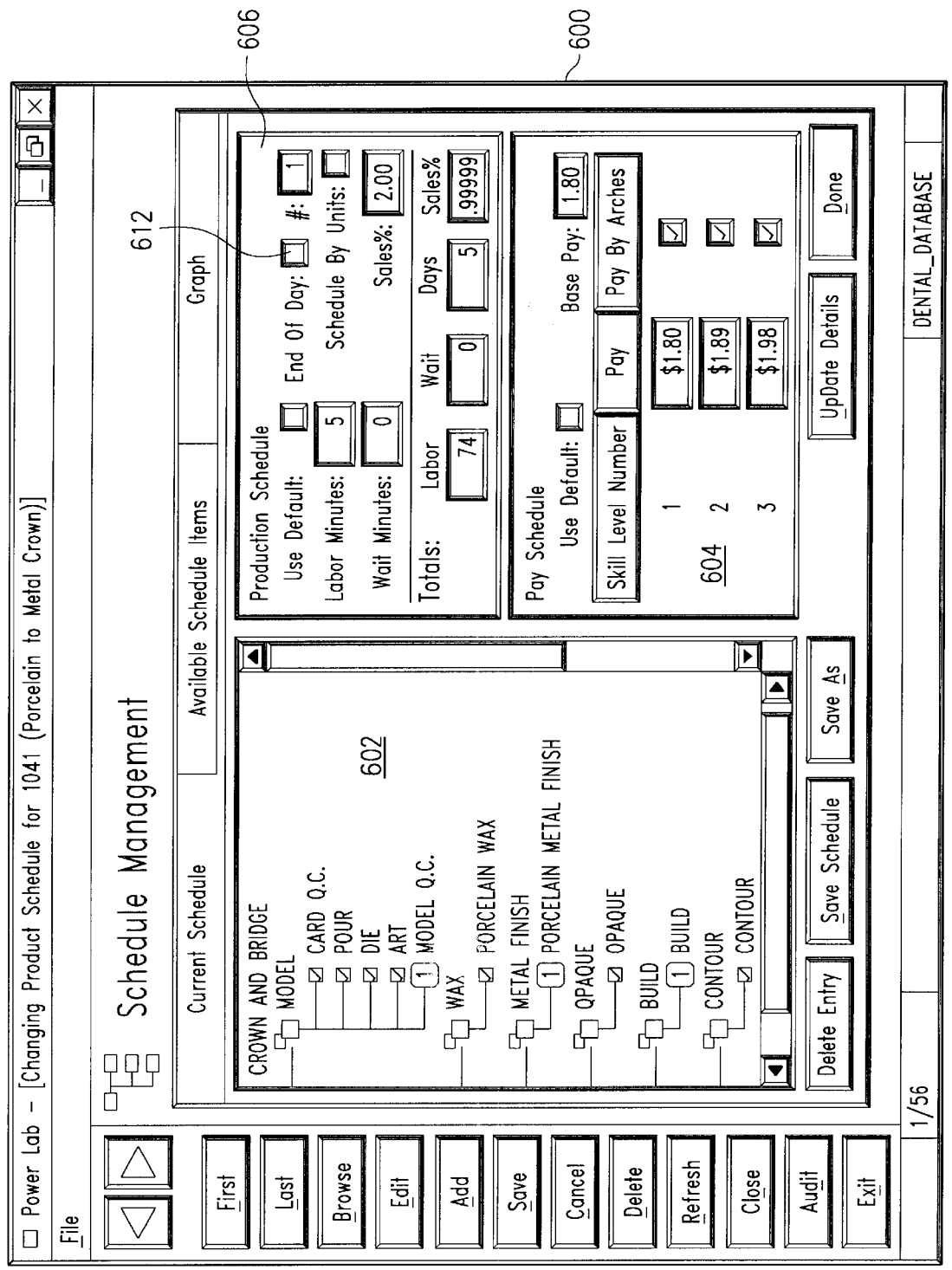
FIG. 6A illustrates a screen display of the production/pay system of FIG. 1 for assigning the dollar amount to be paid to an employee with respect to each scheduled function.

FIG 6A illustrates a Schedule Management screen 600 for assigning the dollar amount to be paid to an employee for performing each scheduled function. As previously described with reference to FIGS. 1 and 5, when a case is received at the lab, it is assigned a schedule based on the products that are to be built for the case. The Schedule Management screen 600 is used to designate the dollar amount that an employee is to be paid for performing a function in the case. For example, as shown in FIG. 6A, the screen 600 shows a schedule of functions 602 that are to be performed and the configurations for each of those functions. To assign a dollar amount to a function, the function is selected from the schedule 602 and a pay schedule portion 604 of the screen 600 is completed. For example, as shown in FIG. 6A, a function "CARD Q.C." is selected and the Pay Schedule portion 604 has been completed to indicate that an employee assigned a skill level of "1" will be paid $1.80 per unit (i.e., per tooth) of the designated function, in this case "CARD Q.C." performed for a case. Similarly, an employee assigned a skill level of "2" will be paid $1.89 per unit of CARD Q.C., and an employee assigned a skill level of "3" will be paid $1.98 per unit of CARD Q.C.

It will be recognized that the skill levels for each employee for each function are assigned as described with reference to FIG. 4. If the "Pay By Arches" checkbox is checked, the technician is to be paid the indicated dollar amount for the corresponding skill level for each arch that is to be worked on for the case; conversely, if the checkbox is not checked, the technician will be paid the indicated dollar amount as a flat fee for the case.

Figure 6B:
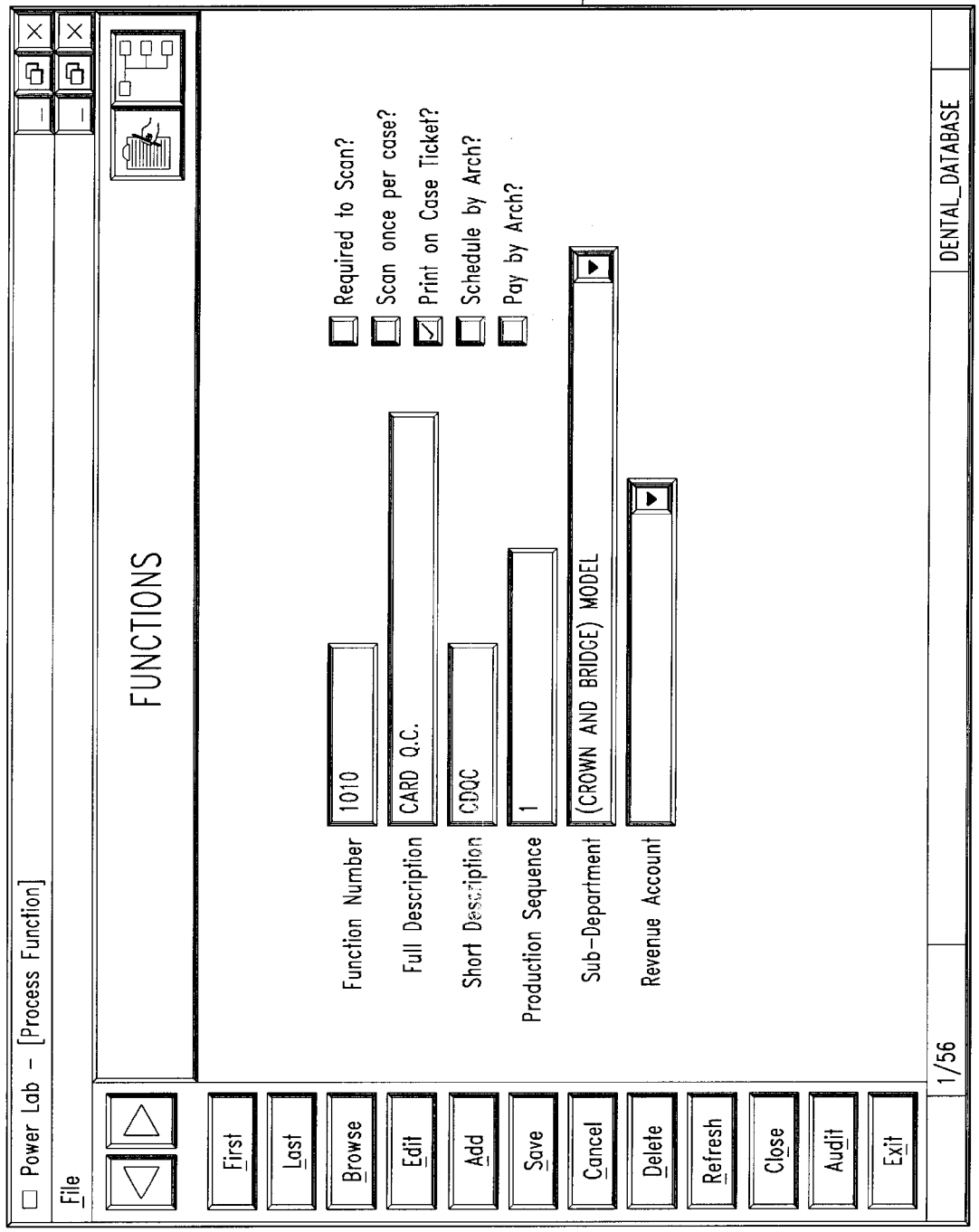
FIG. 6B illustrates a screen display of the production/pay system of FIG. 1 for setting up a function.

As used herein, an "arch" is an upper set of teeth or a lower set of teeth. Accordingly, a case can involve either the upper arch or the lower arch or both upper and lower arches, depending on which teeth are to be worked on for the case. When setting up a function, as illustrated in FIG. 6B, the user specifies in the corresponding fields the function number, a full and short description of the function, a production sequence, a sub-department, and a revenue account for the function. In addition, the user indicates, by checking a corresponding checkbox, whether the function is to be scheduled and/or paid by the arch.

Additional information for each function must be entered in a "Production Schedule" portion 606 of the screen 600. In particular, each function listed in the schedule 602 has associated therewith a symbol comprising either a checkbox 608 or a stop sign 610. When a function is added to the schedule 602, it is initially assigned an empty checkbox so that the user will know that the function has not yet been properly configured for use in production/pay system 10 calculations. Once the user provides all of the necessary information for the function in the Production Schedule portion 606, such as labor minutes ("Labor Minutes"), wait minutes ("Wait Minutes"), and sales percentage ("Sales %"), a check is entered in the checkbox. If the "End Of Day" checkbox 612 in the Production Schedule portion 606 is checked, the corresponding function will have associated therewith a stop sign 610 indicating that the function is the last function that will be performed on the schedule 602 for the then current production day. The number on the stop sign indicates the number of days to add to the schedule for this function; that is, the number of days production must "wait" after the function has been completed. Typically, the number "1" will be indicated on the stop sign. In some cases, however, it will be necessary to wait more than one day after completion of a particular function to proceed with production. In that case, the required number of days is inserted in the field of the Production Schedule portion 606 labeled "#" and that number will be indicated on the stop sign 610 for the function.

As previously indicated, each time an employee performs a unit of a function on a case, they enter three items of information into the production/pay system 10. These items are (1) the case number, (2) the function number, and (3) their employee number. When payroll is being calculated and the production/pay system 10 reads back through the transactions performed by each employee, the system can calculate the number of units worked on and the dollar amount paid for each unit. Accordingly, the system 10 can calculate the "production dollars" for a specified evaluation period for an employee by multiplying the total number of units by the dollar amount paid for each unit.

FIG. 7 illustrates a work ticket information screen 700. A function list 702 at the top of the screen 700 lists each function that must be performed on a case before the case is completed. It will be recognized that the list 702 is created when the case was entered and assigned a schedule, as described above with reference to FIG. 5. A transactions list 704 at the bottom of the screen 700 lists each production transaction that has been performed for the case thus far. The items on the screen 700 that are most important to the production/pay system are the entries in a "Units" column 706 in the function list 702, a "Type" column 708 in the transaction list 704, a "Status" column 710 in the transaction list 704, a "Date" column 712 in the transaction list 704, and an "Employee" column 714 in the transaction list 704.

In particular, each entry in the Units column 706 indicates the number of units to be completed for the corresponding function. Each entry in the Type column 708 indicates whether the transaction is a production transaction ("P"), extra credit given by a supervisor ("CR"), or a reject ("RJ"). Each entry in the Status column 710 indicates whether the corresponding transaction is active or was rejected for some reason. Each entry in the Date column 712 indicates when the corresponding transaction was completed. Each entry in the Employee column 714 indicates which employee completed the corresponding transaction.

Based on the information shown on the screen 700, it can be determined what transactions have been performed for a given date, who performed each transaction, how many units should be paid for a transaction, and whether the transaction is active or was rejected for some reason. With these facts, the system can calculate the number of units for which an employee should be paid during a specified evaluation period, as described in greater detail below.

When a button 706 designated "Reject Production" is selected, a "Reject Production" screen 800 (FIG. 8) pops up to query the user as to details about the rejection. The user must select a transaction from the list 801 on the left side of the screen 800 in which functions are listed by number and name. On the right side of the screen 800, the user is prompted to select a reason for rejection using a drop-down list 802. The user must then select at least one of the options for affecting employee pay in a check box section 804. Any combination of the four options in the check box section 804 may be selected. Selecting the first check box ("Remove pay credit for selected function.") will result in the employee who entered the rejected transaction not being paid for the work that was done on the rejected transaction. The system 10 is user-configurable for the number of rejections allowed for an employee during a pay period. Selecting the second check box ("Count as a reject against the function's employee.") will result in the rejected transaction counting against the employees allotted number of rejections. Selecting the third check box ("Remove pay credit for subsequent functions.") will result in all transactions on this case that occurred after the rejected transaction not to be paid for, even though those subsequent transactions were probably performed by an employee other than the one who performed the rejected transaction. The purpose of this option is to encourage employees to check for flaws in products before performing any additional work thereon. Finally, selecting the fourth check box ("Count as a reject against subsequent functions.") will cause all transactions following the rejected transaction to count as rejects against the employees who performed the transactions.

Figure 9:
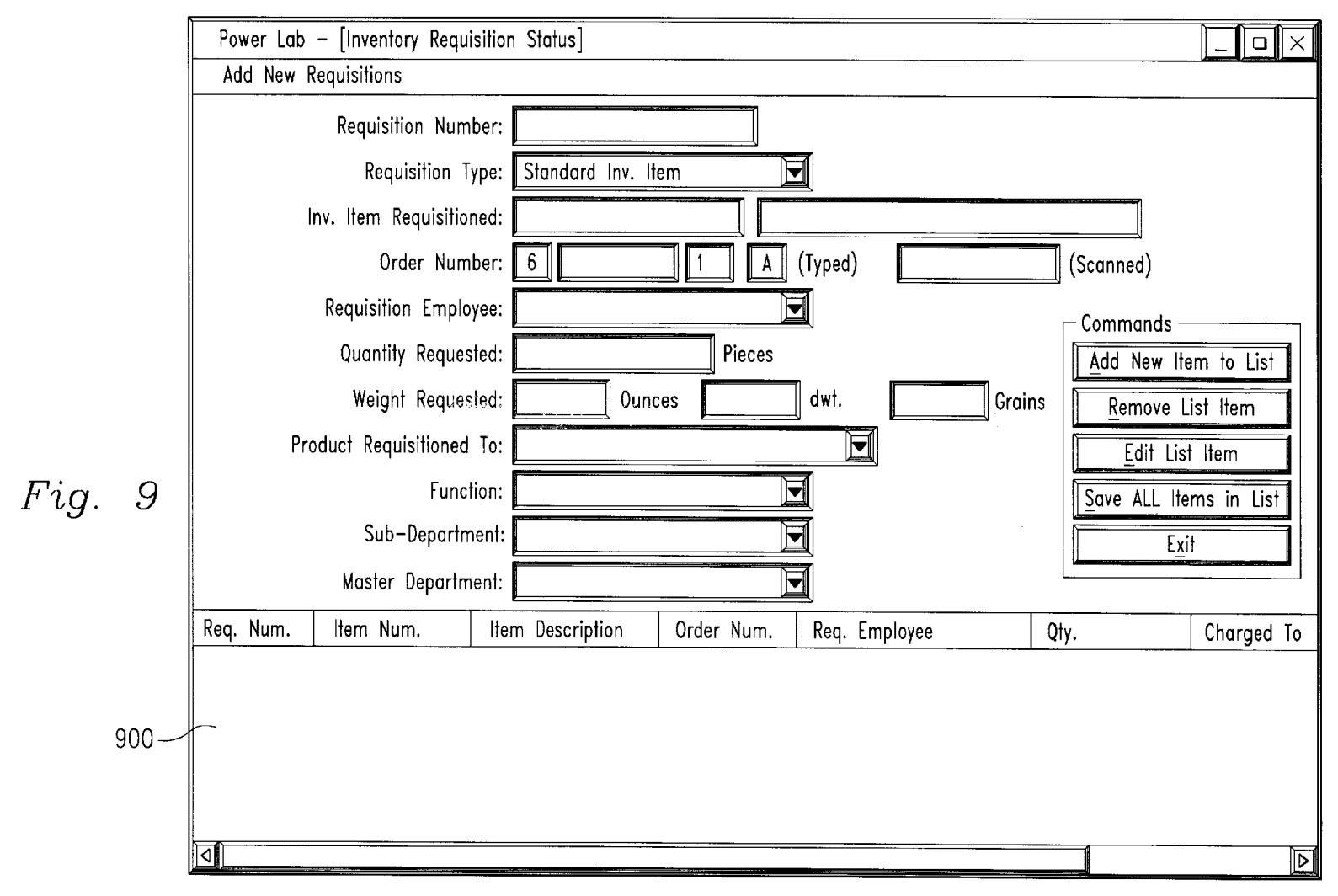

FIG. 9 illustrates an "Add New Requisitions" screen display 900 for enabling an employee to requisition materials. As shown in FIG. 9, when inventory is requisitioned, an employee name is required ("Requisition Employee"). When the inventory requisition is completed by an inventory manager, whatever amount is filled against that requisition is tracked to the employee who originally requested the material ("Product Requisitioned To"). To include "materials usage" in payroll calculation, an average of materials used is calculated for the department, then each employee's materials usage is compared against the average. The system 10 can be configured so that individual employees whose materials usage is above average are penalized with a percentage reduction in pay for the pay period, while those whose materials usage is below average are rewarded with a percentage increase in pay for the pay period.

FIG. 10 illustrates an "Employee Time Review" screen 1000, which is used to review and adjust all of the hours that an employee has worked during the evaluation period specified in a "Date Range" section 1002. The system has a time clock module for the employees to clock in and clock out as appropriate. Adjustments are needed when, for example, an employee forgets to clock in or out or works overtime unnecessarily. The screen 1000 also includes an Employee Time Summary section 1004, in which the time for the indicated employee, in this case "Cathy Julius", is summarized by date, type (e.g., sick leave ("SCK"), vacation ("VAC"), etc.), and amount in minutes, and a Time Clock Transactions section 1006 which provides additional details of the employee's time clock transactions.

In general, as more particularly described below, the system 10 uses the entered information as follows. First, the total number of hours each employee worked during a specified evaluation period is calculated. In a preferred embodiment, the evaluation period will be the preceding three month period. Next, the total number of dollars that the employee earned during the evaluation period is calculated. At this point, the system can calculate a rate/hour that the employee will be paid during the next pay period. The length of the evaluation period used in calculating the total dollars and total hours is configurable and the number of upcoming pay periods that the employee will maintain the calculated hourly rate is also configurable and can be changed at any time.

FIG. 11 illustrates a screen display 1100 for reviewing each employee's payroll dollar calculation for an evaluation period specified by entering a start date in a field designated "Period Start" and an end date in a field designated "Period End". The screen 1100 shows each employee's payroll dollar calculation in dollars for a particular function as a corresponding entry in a Net Dollars ("Net $") column 1101 for the specified evaluation period, in this case, Sep. 24, 1996, through Dec. 17, 1996. The system 10 will process through every transaction performed by each employee during the specified evaluation period. Transactions that were performed successfully (i.e., not rejected) will be added to a Production Dollars ("Prod. $") column 1102 for the employee for the corresponding function. Any extra credit that is given to an employee for performing a function is added to a Credit Dollars ("Credit $") column 1104 for the corresponding function. Any remakes that were necessitated by an employee for a particular function will be added to a Remake Dollars ("Remake $") column 1106. Amounts deducted for excessive remakes are indicated in a Reject Dollars ("Rej. $") column 1107 for the function. A percentage adjustment for excessive materials usage in connection with the performance of a particular function is reflected in an Adjustment Percentage ("Adj. %") column 1108 for the function. The percentage indicated in the Adj. % column 1108 is base on the percentage of materials overuse as compared to other technicians in the same department. The entry in the Adj. % column 1108 will be negative if the employee is above the department average for materials usage and positive if the employee is below the department average for materials usage for the function.

Entries in a Gross Dollars ("Gross $") 1110 are calculated by adding the corresponding entries for the employee and function for the specified evaluation period in the Product Dollars column 1102, Credit Dollars column 1104, and Reject Dollars column 1106. "Materials Usage Dollars" is equal to the Adjustment Percentage multiplied by Gross Dollars.

The entries in the Net Dollars ("Net $") column 1101 are calculated for the corresponding employee and function for the specified evaluation period using the following equation:

Production Dollars+Credit Dollars+Materials Usage Dollars−Remake Dollars (1)

It should be noted that the above-identified dollar amounts are first calculated for each employee separately for each function. For example, employee number 2 will have entries of $2.00, $.00, $.00, $2.00, and $2.00 in columns 1102, 1104, 1106, 1110, and 1101, respectively, for function 1009, entries of $4.00, $.00, $.00, $4.00, and $4.40 in columns 1102, 1104, 1106, 1110, and 1101, respectively, for function 1011, and entries of $6.00, $2.00, $.00, $8.00, and $8.80 in columns 1102, 1104, 1106, 1110, and 1101, respectively, for function 1013. A total for each of the "Dollars" columns 1101, 1102, 1104, 1106, and 1110 for the employee is reflected in an entry at the bottom of the column.

A description of an exemplary use of the system follows. Assuming the system is configured to look back over three months history to calculate the Total Net Dollars and Total Hours for each employee for each function and further assuming that the system is configured to pay the calculated pay rate for one month at a time before recalculating, the system will look back through the transactions performed by each employee for each function for the previous three month and evaluate those transactions to determine the Production Dollars, Credit Dollars, Materials Usage Dollars, and Remake Dollars. These values are plugged into equation (1) above to determine the Net Dollars for each function for the three month period. The Net Dollar amounts for each function are added to determine a Total Net Dollars amount for the employee for the three month period. The system then goes back through the past three months time clock transactions to determine the Total Time worked by the employee for the same three month period. Each employee's Total Net Dollars is divided by their Total Time to come up with an hourly rate, reflected as an entry in a Rate column 1112 that the employee will be paid for all hours worked during the next month.

For example, referring to FIG. 11, the Total Net Dollars for employee number 2 during the evaluation period is $20.60. The Total Hours worked by the employee are indicated as 8.00. Accordingly, the Rate for the employee for the upcoming pay period(s) is $2.58.

Figure 12:
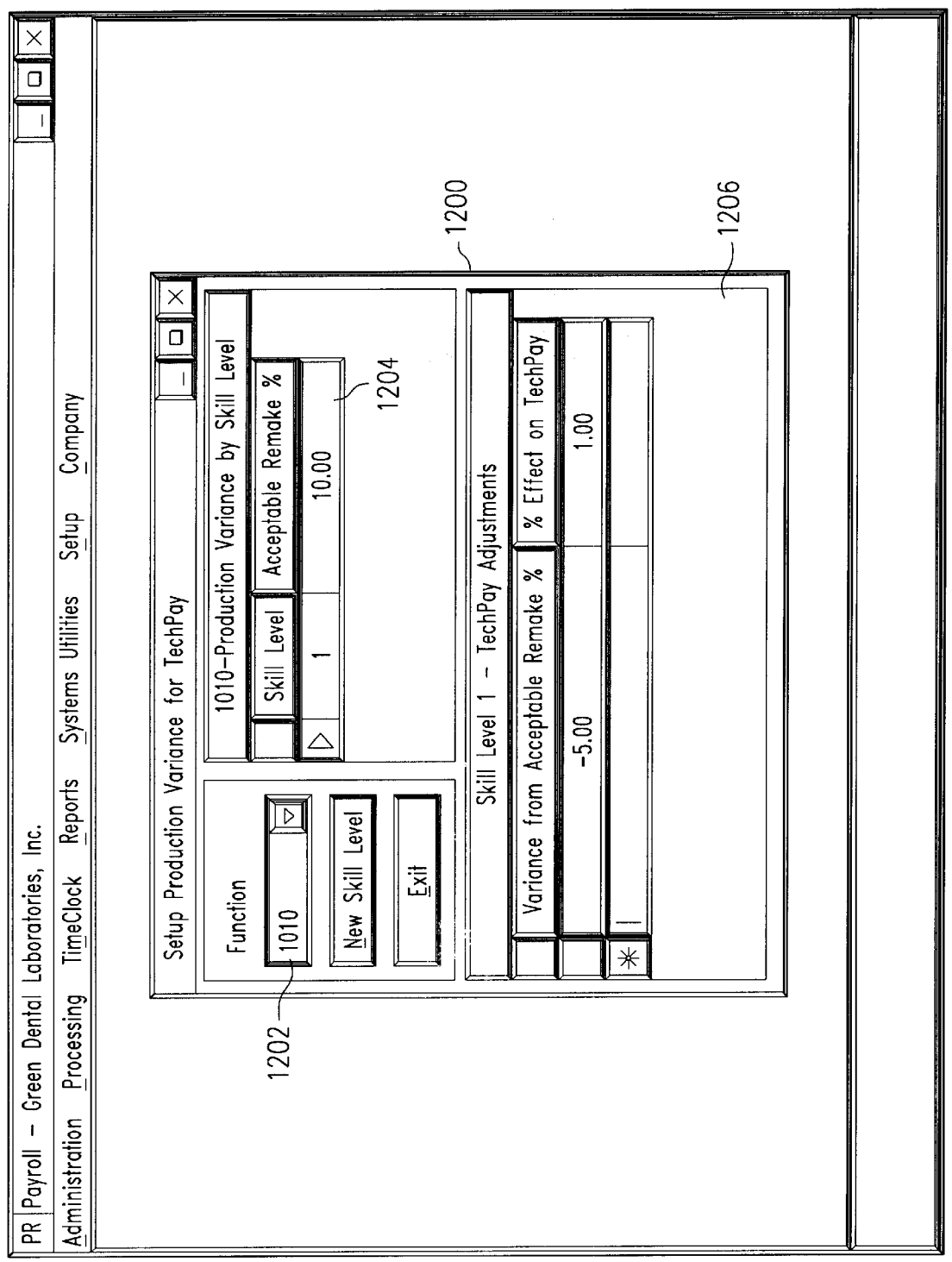
FIG. 12 is a screen display of the production/pay system of FIG. 1 for adjusting an employee's pay based on a number of remakes necessitated by the employee.

FIG. 12 illustrates a "Setup Production Variance" screen 1200, which is used to adjust a technician's pay based on the number of remakes for which the technician was responsible during the evaluation period. First, a function is selected from a dropdown list labeled "Function" (1202). Next, the skill level of the technician is selected from a table labeled "Production Variance by Skill Level" (1204). Then, the acceptable remake percentage for the selected function and skill level is entered in the table 1204 opposite the selected skill level. For example, as shown in FIG. 12, the acceptable remake percentage for a technician having a skill level of 1 for performing function 1010 is 10%. Using a table labeled "TechPay Adjustments" (1206), an existing entry is selected by clicking on the entry or a new entry may be added by clicking on the blank entry line. To add a new entry, the user enters the "variance from Acceptable Remake %" in the first column of the selected row of the table 1206 and then enters the "% Effect on TechPay" that the variance will result in.

For example, for a technician performing function number 1010 at a skill level of 1, a 10% remake factor is acceptable. If a particular technician's remake factor for the function during the evaluation period is 5% (the acceptable 10% remake factor plus a negative a 5% variance) or less, then the technician will receive a 1% increase in his pay calculation. The screen 1200 can also be used to deduct a percentage from the technician's pay calculation for a positive variance.

Figure 13A:
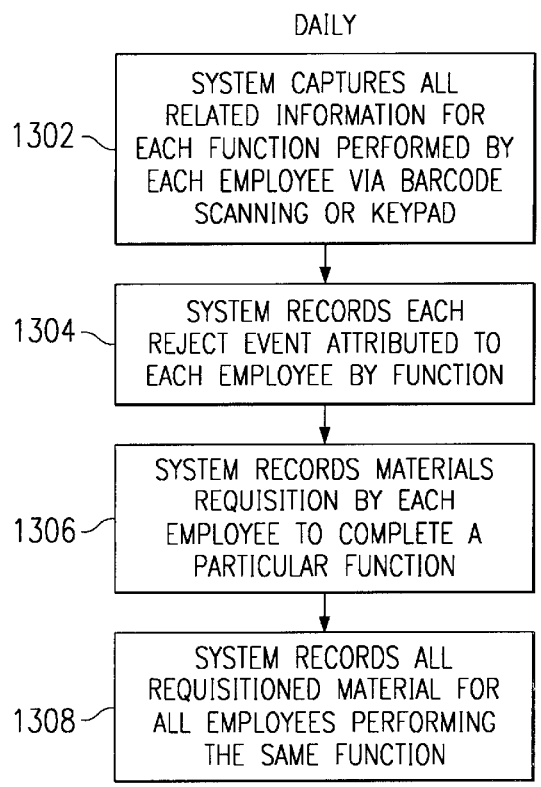
FIG. 13A is a flowchart illustrating the functions performed by the production/pay system of FIG. 1 on a daily basis.
Figure 13B:
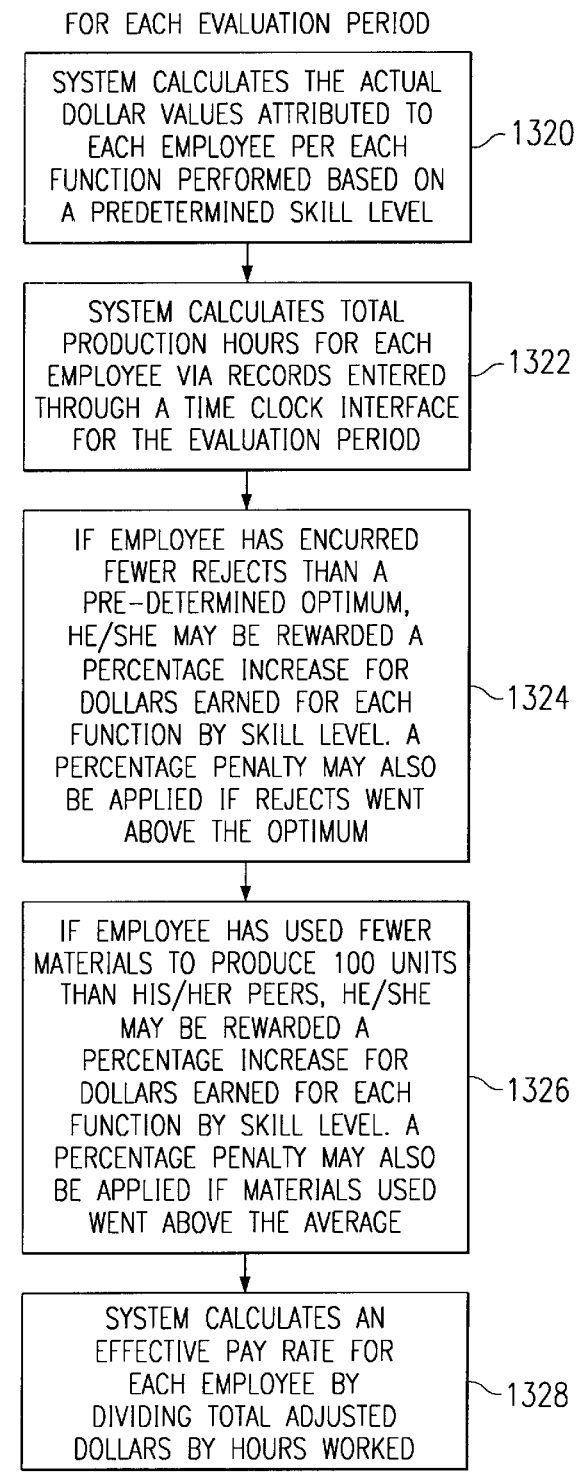
FIG. 13B is a flowchart illustrating the functions performed by the production/pay system of FIG. 1 on a periodic basis.

FIGS. 13A and 13B are flowcharts indicating the functions performed by the system 10 on a daily (FIG. 13A) and periodic (FIG. 13B) basis. As shown in FIG. 13A, the system 10 captures all related information for each function performed by each employee using a barcode scanner or a keypad (step 1302). The system 10 records each reject event attributed to each employee by function (step 1304). The system 10 records materials requisitioned by each employee to complete a particular function (step 1306). Finally, the system 10 records all requisitioned material for all employees performing the same function (step 1308). As previously indicated, each of steps 1302–1308 are performed on a daily basis.

As shown in FIG. 13B, for each evaluation period, the system 10 calculates the actual dollar values attributed to each employee for each function based on the employee's skill level for the function (step 1320). The system 10 calculates total production hours for each employee for the evaluation period using records entered through a time clock interface to the system 10 (step 1322). If the employee is responsible for fewer rejects than a predetermined optimum number of rejects, he/she may be rewarded a percentage increase for dollars earned for each function by skill level. A percentage penalty may also be applied if the number of rejects incurred by the employee were above the optimum (step 1324). If the employee has used less materials to produce a certain number of units (e.g., 100 units) than the average amount of materials used by his/her coworkers to produce the same number of units, he/she may be rewarded a percentage increase for dollars earned for each function by skill level. A percentage penalty may also be applied if the amount of materials used by the employee was above the average (step 1326). The system 10 calculates an effective pay rate for each employee for the next pay period by dividing the total adjusted dollars (taking into account adjustments made in steps 1324 and 1326) by the number of hours worked by the employee during the evaluation period (step 1328).

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of implementing an integrated production tracking and pay rate calculation system in a dental laboratory having a plurality of employees, the method comprising:

for each dental arch comprising a plurality of teeth to be produced by said dental laboratory employees, constructing a function schedule for said dental arch comprising a plurality of selected functions to be performed for said dental arch;

in connection with performance of one of said selected functions by one of said employees, receiving and recording information including:
a case number of said dental arch;
a function number of said one of said selected functions;
an employee number of said one of said employees;

for each of said employees:
determining a number of hours worked by said employee during an evaluation period;
for each function performed by said employee during said evaluation period, calculating a dollar amount attributable to said employee for performing said function; and
calculating a new pay rate for said employee for a next pay period by:
adding all of said dollar amounts attributable to said employee for said functions performed by said employee during said evaluation period to determine a total dollar amount attributable to said employee for said evaluation period; and
dividing said total dollar amount attributable to said employee for said evaluation period by said number of hours worked by said employee during said evaluation period.

2. The method of claim 1 wherein said constructing a schedule comprises selecting at least one function from a list of functions each having one or more skill levels associated therewith.

3. The method of claim 1 further comprising, for each of said employees, recording by function an aggregate amount of materials used by said employee in performing said function.

4. The method of claim 1 further comprising, for each of said employees, calculating an amount of pay due said employee for said next pay period by multiplying a total number of hours worked by said employee during said next pay period by said new pay rate.

5. A computer program for implementing an integrated production tracking and pay rate calculation system for use in a dental laboratory having a plurality of employees, the computer program stored on at least one computer-readable medium and comprising:

instructions for constructing a function schedule for a tooth-based product, such schedule comprising a plurality of selected functions to be performed for said tooth-based product;

instructions for receiving and recording information in connection with performance of one of said selected functions by one of said employees, said information including:
a case number of said tooth-based product;
a function number of said one of said selected functions;
an employee number of said one of said employees;

instructions for determining a number of hours worked by each of said employees during an evaluation period;

instructions for calculating by function a dollar amount attributable to said employee for performing said function during said evaluation period; and instructions for calculating a new pay rate for said employee for a next pay period by adding all of said dollar amounts attributable to said employee for said functions performed by said employee during said evaluation period to determine a total dollar amount attributable to said employee for said evaluation period; and dividing said total dollar amount attributable to said employee for said evaluation period by said number of hours worked by said employee during said evaluation period.

* * * * *